March 22, 1949.　　　　　　　　E. BODMER　　　　　　　　2,464,845
DEVICE FOR CONTROLLING THE TURRETS
OF AUTOMATIC LATHES
Filed June 18, 1945　　　　　　　　　　　　　　　　5 Sheets-Sheet 1

Inventor
Ernest Bodmer

March 22, 1949.                    E. BODMER                    2,464,845
                        DEVICE FOR CONTROLLING THE TURRETS
                                OF AUTOMATIC LATHES
Filed June 18, 1945                                          5 Sheets-Sheet 2

Inventor
Ernest Bodmer
By [signature] Attorney

March 22, 1949. E. BODMER 2,464,845
DEVICE FOR CONTROLLING THE TURRETS
OF AUTOMATIC LATHES
Filed June 18, 1945 5 Sheets-Sheet 5

Inventor
Ernest Bodmer

Patented Mar. 22, 1949

2,464,845

UNITED STATES PATENT OFFICE 2,464,845

DEVICE FOR CONTROLLING THE TURRETS OF AUTOMATIC LATHES

Ernest Bodmer, Grand-Lancy-Geneva, Switzerland

Application June 18, 1945, Serial No. 600,117
In Switzerland August 21, 1944

4 Claims. (Cl. 29—41)

In known automatic lathes, the controlling of the movements of the spindle of the turret-head carrying the tools is effected by cams, having as many cam faces as the turret has working positions. These cams are called "pilot cams," since they determine the cycle of all the operations effected by the lathe. In fact, since each of these cams must necessarily make one complete revolution in the course of a complete cycle of operations, it fixes the different phases of operations which the cycle comprises, since the movements of the tool holders of the turret are made in conjunction with those of the other tool holders, and since, to each working position of the turret, there must correspond an operation effected by a turret tool and other operations effected by the other tools carried by other tool holders with which the lathe is fitted. In certain cases, one of the operations, which should be effected by the turret, cannot be performed, because its tool would come into conflict with another tool.

In this case one of the cam faces of the pilot cam has to be replaced by a blank circumferential space, and the operation has to be effected as a re-setting operation. The pilot cams are very difficult to design, since in the case of a turret with six working positions, for example, it should have six cam faces for controlling each of the six tools at the required cutting speed, these six cam faces being separated from each other by blank circumferential spaces along circular arcs corresponding to the time necessary for the return of the tools to the position of rest, and for the rotating, that is to say the indexing of the turret. The angular length of a slope added to the adjacent blank circumferential space, corresponds to the duration of one phase of operations of the cycle of operations. The durations of the different phases of operations may differ from each other. It is at once evident, that to obtain certain and precise control of the tools carried by the turret, the pilot cam should be of very large diameter, for example 1 meter. It follows that these cams are extremely costly, heavy and bulky.

Besides that, even when diameters of the order of a meter can be used, these cams do not always allow the requisite speed of feed to be obtained for the work in hand. In fact, as long as the angle included between the profile of the cam and the axis of the displacements of the tappet cooperating with this profile is less than 45°, there will be some interference. The movement of the tool holder is no longer regular; that is to say, its speed is not uniform. The movement is intermittent, thus making good machining quite impossible. It follows, that in many cases it is necessary to allow a machining time longer than what is really required, and this results in time being lost.

Because of the difficulty of designing this cam for each different new workpiece, it is this cam which determines all the other operations of the cycle of operations, their sequence and their number, as well as their distribution in the different phases of operations; this is done in order to bring within each phase of operations all the work requiring approximately the same time to execute, and thus to avoid, as far as possible, idle or partly idle times, that is to say, times, during which one part only of the tools entering into action in the course of a phase of operations is actually at work.

Certain designers have produced automatic lathes in which the pilot cam is a universal cam, that is to say one whose effective active lengths may be modified as desired. These cams possess a serious drawback from their basic design. In fact, they only allow movements to be carried out at constant speed, so that they can only be used for machining comparatively simple pieces.

Finally, all the cams of a given automatic lathe, which are necessary for machining a given workpiece, constitute a set of cams. All the cams of this set must be designed separately in accordance with the sequence of the intended operations, the paths traversed by the tools, the speed of their feed per revolution of the spindle, and the admissible cutting speed. Such a set of cams therefore needs very thorough theoretical designing, which must be done by a competent person. This design may require a considerable time. Further, the making of the cams is a difficult piece of work and needs special machine tools, since the machining of the cam faces require special and accurate work to obtain a drive at constant speed, or at a uniformly increasing speed of the movement of the tool.

Nevertheless, one of the most serious drawbacks of lathes with such cams is that if, when a set of cams is tested, it is found that one of the speeds of the feed of one of the tools or that one of the cutting speeds, is too high, the whole set of cams must be rejected and its study must be taken up again entirely from the beginning. But during all the time required for calculating and making the new set of cams, which may amount to several days, the lathe remains at rest useless, so that a considerable amount of time is lost.

The subject matter of the present invention is a device for controlling the turret of an automatic lathe fitted with a plurality of tool slides, which are moved successively and independently of each other. This device tends to eliminate the cited drawbacks and differs from known devices by the fact that it comprises a control member intended to control the tool slides of the lathe successively, this control member being connected to a source of energy by means of a connecting member, which is brought into the working position at the desired moments by means of orders issued by a distributor and by the fact that safety and interlocking means are provided to prevent the rotating of the turret as long as the tool slide has not returned to the position it originally left.

Another object of the present invention is a control device of the kind described above, which comprises devices intended to be actuated by the displacements of a member, actuated by the control member in such a way as to cause the latter to stop after the said tool slide has reached its starting position and in which the control member consists of a mechanical member connected mechanically to a motor by means of a coupling.

Still another object of the present invention is to provide a control device for the turret of an automatic lathe, in which the control member consists of a guide-screw, actuated in one sense of rotation or in the other sense by a reversing device.

Furthermore the lathe may also be provided with control members which use electromagnets, whose energising circuits are controlled by circuit-breakers actuated by the distributor and by members displaced by the guide-screw.

Further, the rotation or indexing of the turret may be controlled by an auxiliary shaft, which is connected to the motor by a coupling and which comprises an interlocking device causing engagement of the two parts of the said coupling after the tool slide has returned to its starting position.

Still another object of the invention is a control device of the kind described above, in which the guide-screw is actuated by means of a change-speed device, whose members, determining the speed of actuation of the guide-screw during the working stroke, are set in position by a selector device while the turret is rotating.

The accompanying drawings show by way of example the diagram of connections between the distributor and the lathe for two embodiments of the present invention.

Figure 1:
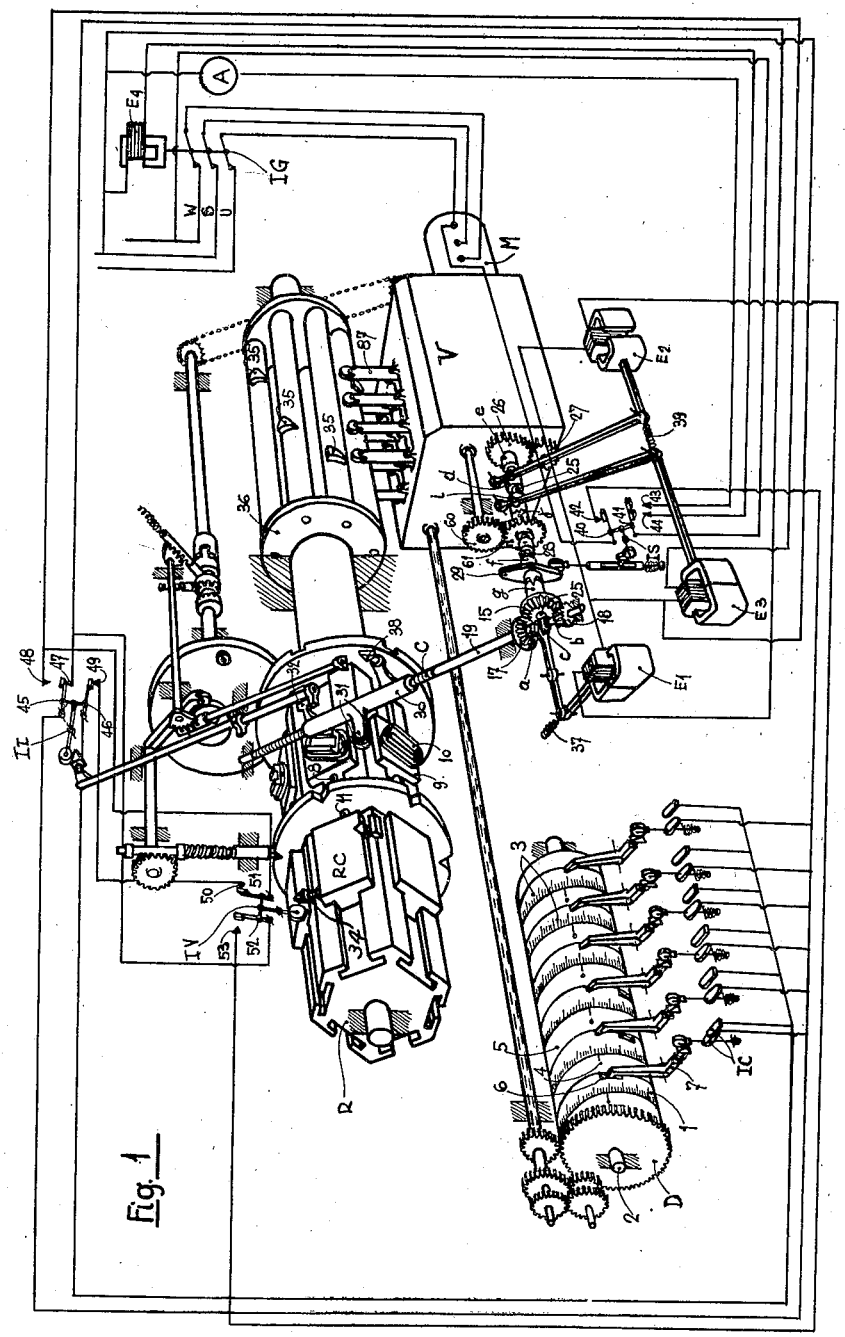
Figs. 1 to 4 illustrate one form of execution diagrammatically.

In the form shown in Figs. 1 to 4, the source of energy is provided by a motor M and the control member is a guide-screw C. Motor M is driven by a three phase source of supply having phase terminals W, S, U, on a master circuit breaker IG which can be actuated by an electro-magnet $E_4$. An electro-mechanical actuating device is provided to set into working position the connecting member, which consists of a coupling. This actuated device comprises a distributor D issuing orders in the form of impulses of electric current. There exists a large number of types of devices which can be used as senders or control stations and which can be utilised and adapted to emit such electric impulses. In principle, such a sender should simply allow the transmission of an electric current in one or several electric circuits at definitely determined instants, and at intervals of time which can be adjusted as desired. Every known device can be used. In the form of the device shown in Figs. 1 to 4, a rotary distributor D is used, consisting of annular members 1 driven by a shaft 2 which is connected to the motor M by means of transmission members. Each of these annular members carries a graduated scale 3, which moves with respect to a mark 4, made on a disc 5, rigidly connected to the shaft 2. Each annular member is provided with a notch 6. An operating member 7 rests on the periphery of each of these annular members. This operating member is subjected to the action of a spring (not shown), which makes the member 7 swing over when a notch passes under its end. This movement of the member 7 causes a circuit-breaker IC to close, this circuit-breaker controlling electric circuits which are described later.

Since such a distributor forms the subject matter of my co-pending patent application Serial No. 600,115 filed June 18, 1945, it is unnecessary to enter into further details here.

The turret R is of the polygonal drum type with horizontal axis. Each face of the turret carries a principal tool slide RC rigidly connected by a bar 8 to an auxiliary slide 9. Each of these latter slides carries on its outer face an actuating member 10, the position of which can be adjusted.

In Figs. 1 to 4, the particular turret shown is of the kind described in a co-pending patent application Serial No. 600,116, filed June 18, 1945, and will therefore not be described more in detail here. Any other type or kind of turret with independent slides or spindles could be controlled by the device which will now be described.

The tool slides are actuated successively and independently of each other by the control member which is constituted by the guide screw C, connected mechanically to a motor by means of a series of transmission members comprising at least:

(a) A device for reversing the direction of rotation of guide screw C;
(b) A connecting device;
(c) A change-speed device V.

The reversing device consists of a crown wheel 15, freely mounted on a shaft 25 and engaging with two pinions 17, 18, freely mounted on a shaft 19, connected mechanically to the guide screw C. This shaft 19 is driven by the speed regulator or speed change device V and by means of a double coupling, whose fixed parts a and b are each rigidly connected to one of the pinions 17 18 and whose movable part c slides on the shaft 19. The displacements of the movable part c are controlled by an electromagnet $E_1$, whose energizing circuit comprises several circuit breakers described later.

In the form of embodiment represented Figs. 1 to 4, the movable part c has only two stable positions, one in which it is in engagement with the part a, and the other in which it is in engagement with the part b. It follows that, for permitting the guide screw C to be put into rotation and to be stopped at any desired instant, a coupling d—e is required. Nevertheless, in a modification of the described device, it would be possible to dispense with this coupling d—e and to provide a third stable position of the part c, in which it would be disengaged from the part $a$ as well as from the part $b$.

The movable part $d$ of the coupling $d$—$e$ slides on the shaft 25 on which a gear wheel 26, rigidly connected to the part $e$ is freely mounted. This gear wheel 26 is in mesh with a second gear wheel 27 which is rotated, at the desired speed, by the speed-change device V. The displacements of this movable part $d$ are controlled by an electromagnet $E_2$, whose energizing circuit includes several circuit-breakers, which will be described later.

The shaft 25 carries, at one of its ends, one part $f$ of a safety coupling, whose other part $g$ is rigidly connected to the crown wheel 15. This coupling is of the type which limits the torque that can be transmitted. For this purpose, the part $f$ slides on the end of the shaft 25 and is urged by the action of a spring 28, which tends to keep it in engagement with the part $g$. When the torque to be transmitted exceeds a certain value, the part $f$ is pushed against the action of the spring 28 and slides on the shaft 25 out of engagement with the coupling part $g$. This part $f$ carries a plate cam 29 which, when it is pushed against the force of the spring 28, causes, by means of a chain of transmission members, a safety circuit-breaker IS to come into action. The actuating of this circuit-breaker causes the following elements to be electrically energized:

(a) An alarm signal A (audible or visible).

(b) An electromagnet $E_4$, controlling the opening of a master circuit-breaker IG connecting the motor M to a three wire supply system U. S. W.

(c) The opening of the energizing circuits of the electromagnets $E_1$, $E_2$, $E_3$.

There is therefore an immediate stoppage of all the operating parts of the lathe.

Finally, in the form shown, and in order to reduce the idle or non-cutting time, the shaft 25 can be driven at an increased speed during the idle periods. For this purpose, it has gear-wheels 60, 61, driven by the change-speed device V and turning the shaft 25 by means of a coupling $i$—$j$. The movable part $i$ of this coupling slides on the shaft 25 and its displacements are controlled by an electromagnet $E_3$.

The energising circuits of the electromagnets $E_1$, $E_2$, $E_3$ and $E_4$ have three bipolar and six unipolar circuit-breakers.

These circuit-breakers are the following:

(a) The safety circuit-breaker IS, comprising two blades 40, 41 and three contacts 42, 43, 44. The contact 42 is connected to the supply line U, and the contacts 43, 44 to the supply line S, one through the signal A and the other through the electromagnet $E_4$;

(b) Six unipolar circuit-breakers IC actuated by distributor D, arranged in parallel to each other and connected on the one hand to the contact 42 of the safety circuit-breaker IS and on the other hand to the poles of a bipolar circuit-breaker II;

(c) The bipolar circuit-breaker II has two blades 45 and 46, one of them, 45, connected electrically to a contact 42 and the other, 46, mounted in series with the circuit-breakers IC. The blade 45 can be placed either on a contact 47, connected to the supply line S by the winding of electromagnet $E_1$, or on a contact 48, connected to the supply line S by the winding of electromagnet $E_3$. The blade 46 can be placed either on a contact connected electrically to a contact 50 of a reversing switch IV or on a "dead" contact (not shown).

(d) The reversing switch IV has two blades 51 and 52. In one of the positions of this switch, the blade 51 connects electrically the contacts 49 and 48 of the circuit-breaker II, while in the other position of this reversing switch, its blade 52 connects electrically the contact 47 to the winding of electromagnet $E_2$ by means of a contact 53.

The movements of the bipolar circuit-breakers II and IV are controlled by the displacements of the principal tool slides RC.

In fact, the guide screw C controls the movements of a principal tool slide RC by means of a long nut 30, carrying a roller 31, intended to come into engagement successively with each of the control members 10, carried on each of the auxiliary slides 9, each of which is rigidly connected respectively to a slide RC. This nut 30 carries also a finger 32 for actuating the circuit-breaker II at the end of the working stroke and at the end of the return stroke of the nut 30.

The circuit-breaker IV is actuated by a finger 34, carried on each of the principal slides RC (for the sake of simplicity, only one finger is shown in the drawing).

Finally, the positioning of the various members of the change-speed device V, determining the speed of the displacements of the nut 30 and therefore of the actuated slide RC, is controlled by a selector device, consisting of operating stops 35 carried by a drum 36, which is rigidly connected to the turret R.

The displacements of the swinging or sliding members of the change-speed device are controlled by levers 87, actuated by the stops 35 during rotation or indexing of the turret. The positions of these operating stops can be adjusted longitudinally by any known device.

The described device operates as follows:

I. *Setting the guide-screw C in action (Fig. 1)*

When all the slides RC are in their positions of rest, the various circuit-breakers and members of the device occupy the positions shown in Fig. 1.

The master circuit-breaker IG being closed, the motor M is energized and causes the distributor D and the change-speed device V to rotate. When a notch 6 on an annular member of distributor D passes under the end of a control member 7, the latter is urged into the notch under the influence of its spring, and the control circuit-breaker with which it is associated, is thus caused to close.

Then the electromagnet $E_1$ is energized over the circuit U, IG, 40, 42, IC, 45, 47, II, $E_1$, S the electromagnet $E_3$ is energized over the circuit U, IG, 40, 42, IC, 49, 51, 50, $E_3$, S.

The energizing of electromagnet $E_1$ causes engagement of the parts $c$ and $a$ of the double coupling and thus operation of the guide-screw C, through action of the crown wheel 15 and the pinion 17.

The energizing of electromagnet $E_3$ causes engagement of the two parts of the clutch $i$—$j$, thus setting the guide-screw C in rotation at an increased speed.

The nut 30 is then displaced at increased speed along the guide-screw C and when its roller 31 comes into engagement with the actuating member 10 of auxiliary slide 9, it drives, at an increased speed towards the left in the drawing, the principal tool slide RC, placed in angular working position.

II. Actuating the slide at the working speed (Fig. 2)

Figure 2:
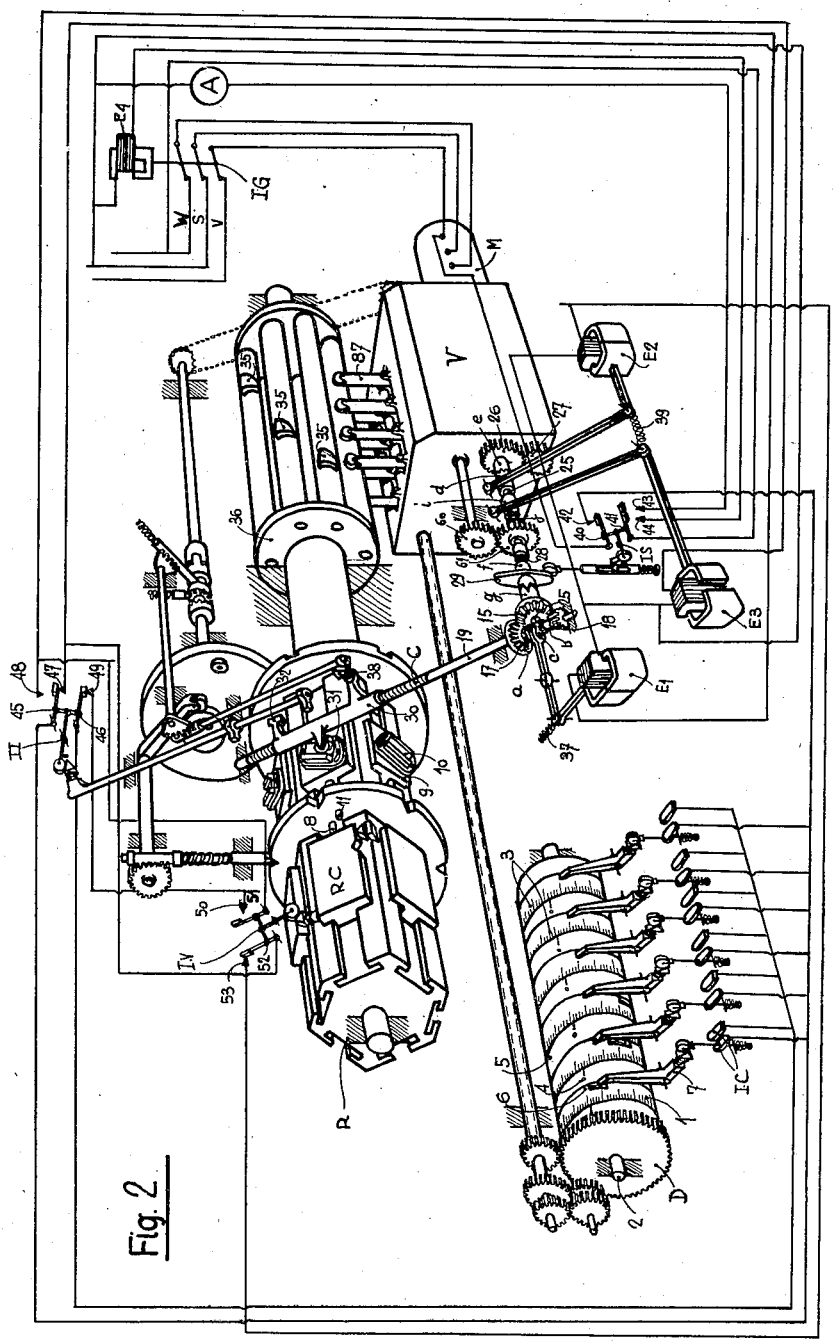

After a certain displacement of this principal tool slide RC, (a displacement, which is slightly less than the idle stroke necessary to bring the tool, which it carries, into the longitudinal position to machine the workpiece), the finger 34 actuates circuit-breaker IV, which moves from the position shown in Fig. 1 to that, shown in Fig. 2. For this position of the circuit-breaker IV, the energizing circuit of electromagnet $E_3$ is opened at contacts 51, 50, and hence the movable part $i$ is disengaged from its fixed part $j$ by the action of a spring 39. On the other hand, electromagnet $E_2$ is electically energized by closing of contacts 52, 53. As shown in Fig. 2, the electromagnet $E_1$ remains energized, so that the guide-screw C continues to be driven in the same sense. On the other hand, energizing electromagnet $E_2$ has caused engagement of the two parts of the coupling $d$—$e$ and the rotating of the guide-screw c at a speed corresponding to that defined by the positions of the adjustable or sliding members of the change-speed device V, determined by the operating stops 35. From this instant, the distributor can control the opening of the circuit-breaker IC, because the electromagnets $E_1$ and $E_2$ remain energized through contacts 42, 45, 47, 52, 53.

III. Stopping at the end of the working stroke and returning to the starting position (Fig. 3)

Figure 3:
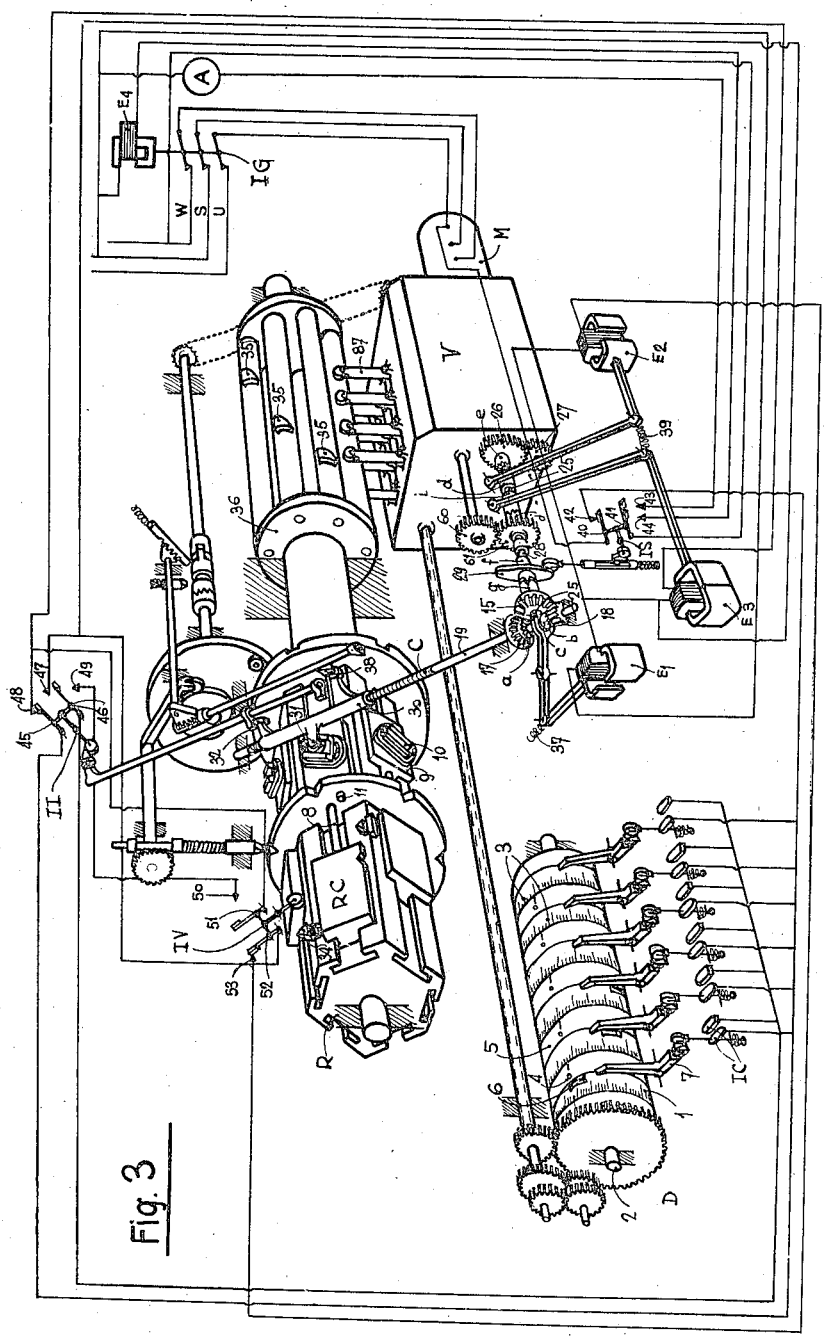
Figure 4:
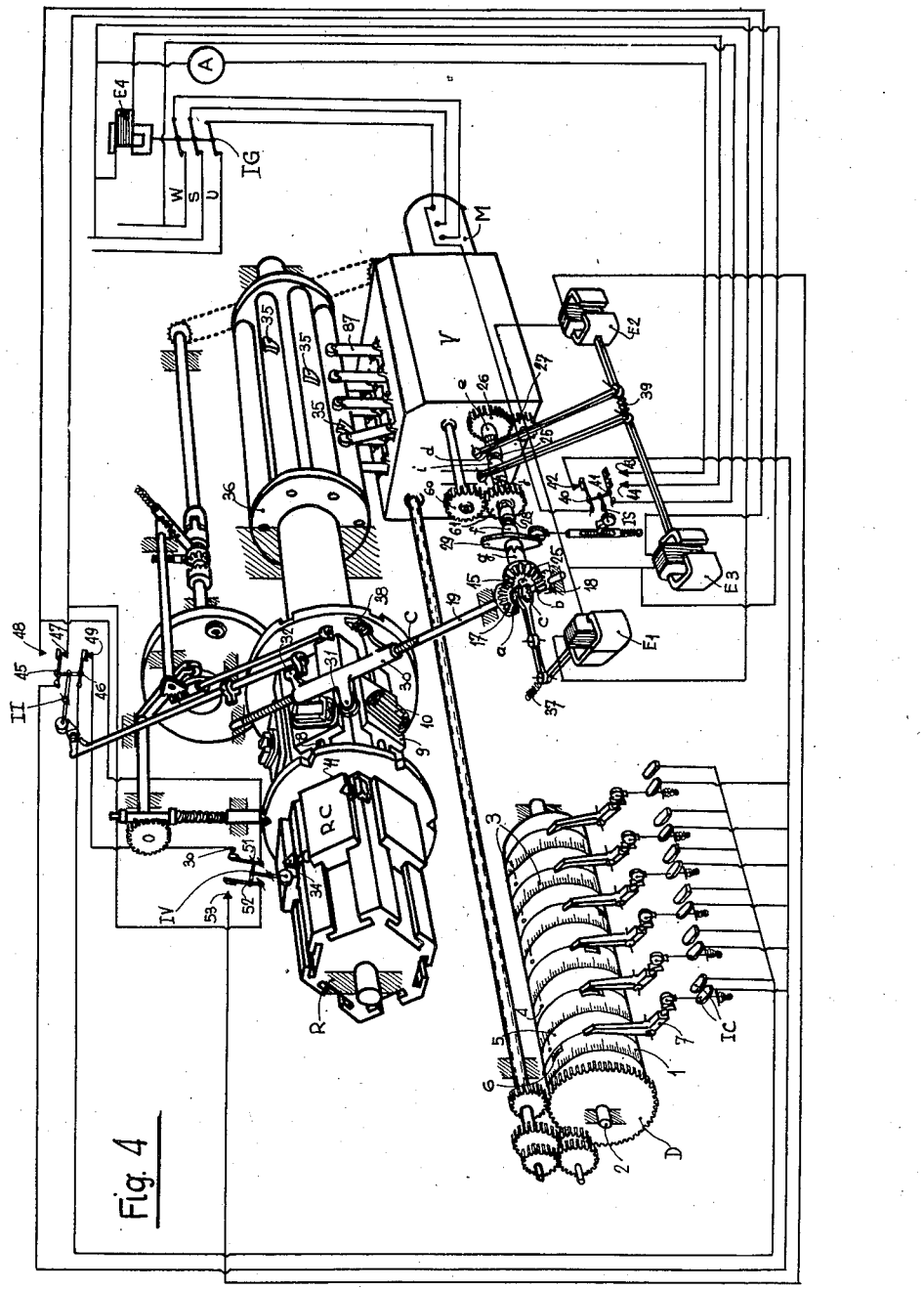

At the end of the working stroke of the selected principal tool-slide actuated, the finger 32 of the nut 30 operates the circuit-breaker II, which moves from the position shown in Figs. 1 and 2 into that shown in Fig. 3. For this position, the circuits energizing electromagnets $E_1$ and $E_2$ are cut off at contacts 45, 47, while electromagnet $E_3$ is energized through contacts 45, 48. Electromagnet $E_1$ being no longer energized, a spring 37 causes disengagement of the clutch parts $c$—$a$ and the engagement of the clutch parts $c$—$b$ of the double coupling, and therefore the driving of the guide-screw C in the contrary sense or opposite direction by means of crown wheel 15 and pinion 18.

The energizing of electromagnet $E_3$ causes, as described above, the actuating at increased speed of the guide-screw C. It follows that the nut 30 and the principal tool slide RC are returned back at an increased speed into the starting position. During its travel, the finger 34 actuates the circuit-breaker IV, which again takes up the position shown in Fig. 1. Nevertheless, this displacement has no effect, since the circuit through contact 50 is interrupted at contacts 46, 49.

IV. Stopping and turret rotation

When the principal tool slide RC reaches a stop 11, whose position is adjustable, the roller 31 leaves the actuating member 10. Finally, when the nut 30 attains its initial starting position, the finger 32 causes the circuit-breaker II to operate and return to the position shown in Fig. 4. From that moment, neither of the electromagnets $E_2$ and $E_3$ being energized, the driving and driven parts of the two clutches $d$—$e$ and $i$—$j$ are kept out of engagement by the spring 39, and the guide-screw C is no longer driven.

Finally, a little before reaching its starting position, the nut 30, by means of a finger 38, brings into action the device for rotating the turret. Since this device is described in my co-pending application Serial No. 600,116, filed June 18, 1945, it will not be described here.

When the operation of rotating the turret from one position to the next position has been completed, the whole device is ready for a new operation, controlled by another annual member of the distributor D. One possible embodiment could provide a circuit-breaker in series with the circuit-breakers IC in the energizing circuit of electromagnet $E_3$, which circuit-breaker would be controlled by the device for rotating the turret or the indexing device of the turret in such a way as to prevent the energizing of electromagnet $E_3$ as long as the rotation of the turret had not been completed.

Nevertheless, such an interlocking arrangement would cause a useless waste of time, and this is why, in the device here shown, the device for rotating the turret acts in such a way that the time required for rotating the turret is less than the time required to move the nut 30, at increased speed, from its starting position until its roller 31 comes into contact with the actuating member 10.

Thus the certainty of functioning is automatically ensured and all idle time is eliminated.

Finally, while the turret is rotating, the drum 36, by means of its operating stops, causes the members of the change-speed device to be set in position in such a way that the guide-screw is driven at the speed required for obtaining the speed of displacement desired for the work which has to be effected by the tool carried by the principal tool slide RC, kept in working position.

From the above and by reference to the accompanying drawings, it will be noted at once that the operations effected by the tools carried by the turret can be performed at any desired moment in the course of the cycle of machining operations provided for the manufacture of a workpiece. In particular, these operations must not necessarily be united with those effected by other tools fitted on the lathe, but be performed whenever there is no longer any danger of collision between two members of the lathe. It is easy to understand, that this possibility gives very great liberty in outlining the program for machining a workpiece and thus an appreciable saving of time in machining a given workpiece.

In addition, since each disc of the distributor can be keyed on the shaft 2 in any desired angular position, it is easy to understand that this distributor at once allows every desired operation to be controlled, and this without requiring the change of any cam, but simply by adjusting the angular positions of the discs 5.

One can without any difficulty fit, on one or several principal tool slides RC, an accessory transverse slide, whose movements would be controlled by a control member and by means of an actuating member, which position may be adjustable. This control member could, in a manner similar to the control member C, be connected mechanically to the motor M by means of a change-speed gear and a coupling member, whose setting into active position would be controlled by a control device, similar to that described below.

It is evident that the actuating member 10 of a principal tool slide RC or of an accessory slide may, as shown in the drawing, be constituted by a rectangular groove, but may also consist by a guide of spacial shape, designed in order to obtain some desired displacement, a movement at variable speed, a reciprocating movement, or any other desired movement.

One understands from this, that the control device described allows every kind of machining to be carried out, such as grinding, slotting, bearings before and after a collar, etc.

Figure 5:
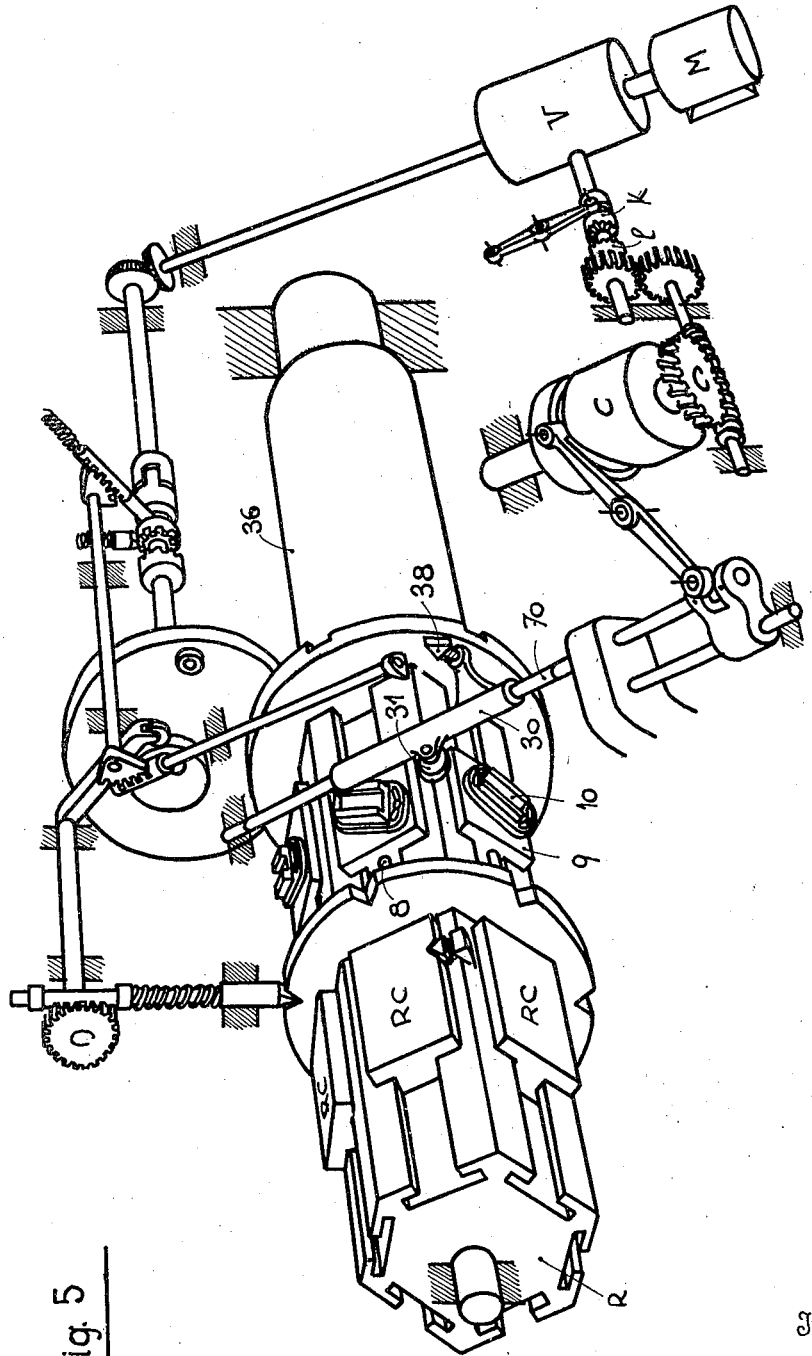
Fig. 5 illustrates a second form of execution diagrammatically.

In the modified form of embodiment shown in Fig. 5, the control member C is constituted by a bell cam, actuated by a motor M and by means of a change-speed device V. The bell cam C is set in rotation by control signals sent by a distributor D (not shown), similar to that described with reference to Figs. 1-4. This distributor, by means of a control device similar to that already described above, causes the engagement of the parts of a coupling k—l connecting the bell cam to the change-speed device V. This form of execution is simpler, since it does not require any device for reversing the direction of rotation of the control member, and since it is not necessary to provide devices to allow the control member to be driven at increased and reduced speeds. In fact, the speeds of displacement of the push-rod 70 are determined by the shape of the bell cam.

Nevertheless, it is evident that if it is desired to have the possibility of obtaining a very great speed of displacement of the tool slides, one may provide a control device similar to that described with reference to Figs. 1-4 and having two couplings connecting the guide-screw to the motor, one for actuating it at an increased speed, the other for actuating it at a reduced speed or at the desired working speed.

It is evident that the distributor D may cause the coupling member to be set in active position either by means of an electro-mechanical control device, or by a mechanical control device similar, for example, to the one described in my co-pending patent application Serial No. 600,112 filed June 18, 1945, or by a pneumatic or hydraulic control device. In the last case, the electromagnets described above may be replaced by servomotors, operating the movable parts of the couplings, while the circuit-breakers and reversing switches may be replaced by slide-valves, connected to a source of fluid under pressure and controlling admission to and discharge from the servomotors.

Finally, the control member may be a motor member (electric or pneumatic), set in movement by orders sent by the distributor D. In this case, the coupling member may be a member such as a circuit-breaker or a slide-valve, allowing the control member to be connected to a source of energy, which may be an electric supply system or a fluid under pressure.

I claim:

1. In a lathe, the combination of a rotatably indexible turret comprising a rotary member of polygonal cross sections, a plurality of principal tool carrying slides carried on said member, each of said slides being mounted thereon individually slidably along a face of said rotary member, auxiliary slides rigidly connected respectively to said tool carrying slides, actuating members fastened to each of said auxiliary slides respectively, a principal control member for displacing in turn each of said principal tool carrying slides by means of said actuating members, rotating driving means, a speed change device driven by said driving means, a settable primary coupling interconnecting a first speed of said speed change device and said principal control member, a distributor, means driven by said driving means to impart rotation of constant speed to said distributor, primary setting means to set said primary coupling in closed position, said primary setting means being controlled by control signals initiated by said distributor, a first actuating member controlled by said principal control member, a motion reversing control member actuated by said first actuating member, auxiliary setting means controlled by said motion reversing control member, a motion reversing device controlled by said auxiliary setting means and adapted to reverse the direction of motion of said principal control member, actuating fingers respectively fastened to said principal tool carrying slides, a speed change control switch actuated by each of said fingers, secondary setting means controlled by said speed change control switch, a secondary coupling controlled by said secondary setting means and interconnecting a second speed of said speed control device and said principal control member, said reversing device being interposed between said principal control member and said primary or said secondary coupling, an indexing control means for controlling the rotation of said rotary member, an engaging auxiliary member controlled by said principal control member, a locking device controlled by said engaging member for causing the rotation of said rotary member when the actuated slide reaches its rest position, and interlocking means arranged for preventing the setting into closed position of said primary coupling as long as the actuated principal slide is out of its rest position.

2. In an automatic turret lathe, a turret having slideways, tool holder slides mounted in said slideways, a worm, a nut threadely carried by said worm and comprising a first projecting finger, individual engaging means carried by each of said slides and mounted separately for engagement with said finger as said nut moves along said worm, a reversing gear mounted for reversibly rotatably driving said worm, a rotating motor, speed change means for deriving from said motor two rotating motions of different speeds, a pair of selectively actuable individual means for selectively connecting said reversing gear to either one of said two derived motions, a program actuator driven by said motor, means associated with said program actuator and said individual connecting means for actuating either of said connecting means, a second finger carried by said nut, and interrupting means interposed between said actuator and said connecting means and actuable by engagement with said second finger and movement of said nut into the position corresponding to the extreme rest position of said slide for preventing a shift from one said connecting means to the other while said slide is in a position other than its extreme rest position, and means actuable by movement of said nut into the position corresponding to the extreme rest position of said slide for thereupon causing reversal of said reversing gear.

3. In an automatic turret lathe, a turret having slideways, tool holder slides mounted in said slideways, a worm, a nut threadely carried by said worm and comprising a first projecting finger, individual engaging means carried by each of said slides and mounted separately for engagement with said finger as said nut moves along said worm, a reversing gear mounted for reversibly rotatably driving said worm, a rotating electric motor, speed-change means for deriving from said motor two rotating motions of different speeds, a pair of selectively actuatable individual clutches for selectively connecting said reversing gear to either one of said two derived motions, a first and a second electromagnetic means for respectively closing each said clutch, a program switch driven by said motor, a second finger carried by said nut, electrical switch means having an actuating element and mounted for actuation by engagement of said second finger with said actuating element and by movement of said nut into the position corresponding to the extreme rest position of said slide, and electrical connections between said program switch and said switch means and said first and second electromagnetic means for selectively connecting for energization one and only one at a time of said first and second electromagnetic means and for changing the energizing connection from the one to the other of said electromagnetic means when said second finger actuates said switch means, third electromagnetic means for causing reversal of said reversing gear, and electrical connections between said switch means and said third electromagnetic means for energizing said third electromagnetic means when said second finger actuates said switch means.

4. A lathe according to claim 3, and overload torque actuatable control means interposed between said clutches and said reversing gear, auxiliary electric switch means actuatable by actuation of said control means, a fourth electromagnetic means for opening the supply circuit of said motor, and connections between said auxiliary switch means and said first, second, third, and fourth electromagnetic means for de-energizing and opening all four said electromagnetic means upon actuation of said auxiliary switch means by application of overload torque to said control means.

ERNEST BODMER.

REFERENCES CITED

The following references are of record in the file of this patent:

UNITED STATES PATENTS

| Number | Name | Date |
|---|---|---|
| 725,438 | Gridley | Apr. 14, 1903 |
| 1,810,227 | Shea | June 16, 1931 |
| 2,118,021 | Curtis | May 17, 1938 |
| 2,289,957 | Godfriaux | July 14, 1942 |
| 2,302,353 | Smith, Jr. | Nov. 17, 1942 |
| 2,330,859 | Bench et al. | Oct. 5, 1943 |
| 2,369,039 | Gocht | Feb. 6, 1945 |